Dec. 30, 1969  R. E. ALLEN  3,486,879
CLAD CHANNEL RIBBON FORMING ROLLS
Filed Oct. 14, 1965   3 Sheets-Sheet 1

INVENTOR.
Richard E. Allen
BY Walter S. Zabrowski
ATTORNEY

Dec. 30, 1969  R. E. ALLEN  3,486,879
CLAD CHANNEL RIBBON FORMING ROLLS
Filed Oct. 14, 1965  3 Sheets-Sheet 2

INVENTOR.
Richard E. Allen
BY Walter S. Zebrowski
ATTORNEY

Dec. 30, 1969  R. E. ALLEN  3,486,879
CLAD CHANNEL RIBBON FORMING ROLLS
Filed Oct. 14, 1965  3 Sheets-Sheet 3

INVENTOR.
Richard E. Allen
BY Walter S. Zabrowski
ATTORNEY

United States Patent Office 3,486,879
Patented Dec. 30, 1969

3,486,879
CLAD CHANNEL RIBBON FORMING ROLLS
Richard E. Allen, Corning, N.Y., assignor to Corning Glass Works, Corning, N.Y., a corporation of New York
Filed Oct. 14, 1965, Ser. No. 495,894
Int. Cl. B01d 13/02
U.S. Cl. 65—253                                         7 Claims

ABSTRACT OF THE DISCLOSURE

Disclosed is an apparatus for forming thin, vitreous glass ceramic ribbon and also a method of using such apparatus. A pair of parallel, driven clad cylindrical rollers have their cylindrical end portions in continuous rolling contact with each other. The rollers are shaped so that an elongated orifice is defined therebetween having closed end portions, the center portion of the orifice being deeper than the end portions. A controlled quantity of readily devitrifiable material is supplied to the rollers to produce a thin, vitreous ribbon having a cross-sectional shape which is characterized by thin edge portions and a thicker center portion. This apparatus is especially useful for roll forming such ribbon from molten, readily devitrifiable glass having a high liquidous temperature, low viscosity, high surface tension and a short working range.

---

By glass ceramic is meant a material that is melted and formed as a glass and then converted to a substantially crystalline state by a process of controlled devitrification. Vitreous glass ceramic refers to glass ceramic in its glassy state before crystallization, while crystalline glass ceramic refers to glass ceramic in its devitrified state. Readily devitrifiable materials are those materials which readily, and often quickly, crystallize during thermal processing.

Under ordinary circumstances it is expected and desired that vitreous glass ceramics be converted to the crystalline state, and good use is made of this phenomenon. However, there are certain circumstances wherein it is desired to maintain a glass ceramic in a vitreous state, even after melting, forming and cooling. One such instance is the particularly difficult formation of substantially continuous, thin, vitreous glass ceramic ribbon. Ribbon lengths of a few feet or more are considered to be substantially continuous. Such ribbon may be used as the dielectric material in stacked electrical capacitors, as image orthicon targets, and the like.

One method for roll forming thin, substantially continuous, vitreous glass ceramic ribbon is disclosed in a copending patent application by Theodore Novack, Ser. No. 157,440, filed Dec. 6, 1961, now U.S. Patent No. 3,227,-537 issued Jan. 11, 1966, and assigned to the present assignee.

In addition, it has been customary in the past to roll form glass sheet or ribbon from materials such as ordinary soda-lime window glass by mean of the ring-roll process, the upward vertical rolling process, or the continuous horizontal process.

In these processes the viscosity of molten glass fed to the rollers is normally about several thousand poises, and the ribbon or sheet so formed is usually between about one-eighth and one inch in thickness. These conventional roll forming methods are completely inadequate and unsatisfactory for producing ribbon having a thickness between about .001 and .010 inch, particularly from materials having a viscosity below about ten poises and a high surface tension which causes them to break up into blobs and droplets in the molten state. Due to their nature, as briefly described above, certain glass ceramics such as the barium titanates and the lead-barium-niobates have been particularly difficult to form into ribbon and maintain in a cooled, vitreous condition. Partial devitrification often occurs suddenly, during forming, in the more slowly cooling portions of the ribbon. Attempts to cool these portions faster has often resulted in ribbon breakage because of its rapid transition from very low to high viscosity when quickly cooled. Attempts to increase forming speed has irritated the condition of slowly cooling ribbon portions, causing the ribbon to exit the rollers in an excessively plastic state. Decreasing forming speed leads either to devitrification or to crushed ribbon. Checks and cracks, beaded edges, warp and bow, and the like are a few of the defects encountered in glass ceramic ribbon forming.

Accordingly it is an object of the present invention to eliminate these and other defects asociated with forming ribbon from glass and glass ceramic materials.

Another object of the present invention is to provide an improved apparatus for roll forming thin, substantially continuous ribbon from low viscosity, high surface tension, molten glass ceramic compositions.

Still another object of the present invention is to provide a means for rolling a vitreous glass ceramic ribbon having a thickness of less than about .002 inch.

These together with other objects, features and advantages of the present invention may be more readily understood from the following detailed description and drawings.

The present invention is an improved apparatus for forming a length of thin ribbon from a vitreous material, comprising a pair of driven cylindrical rollers disposed parallel and in substantially continuous rolling contact with each other, defining therebetween an elongated orifice having closed end portions, the central portion of said orifice being deeper than said end portions; said orifice being formed by a circumferential channel incorporated intermediate the ends of at least one roller, said channel having a bottom portion and sides, said sides terminating in cylindrical shoulder portions to provide said substantially continuous rolling contact between said rollers.

Figure 1:
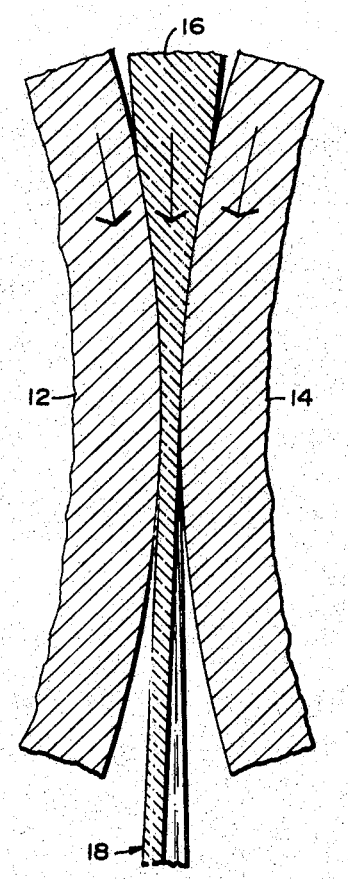
FIGURE 1 is an enlarged, fragmentary, cross sectional view of a pair of prior art ribbon forming rollers.
Figure 2:
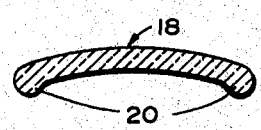
FIGURE 2 is an exaggerated, cross sectional view of a ribbon formed by prior art rollers.

Referring to the drawings, FIGURE 1 shows a pair of prior art rollers 12 and 14 rotating in the direction shown by the arrows. A quantity of molten, readily devitrifiable material 16 is introduced at the bite of the rollers and is formed into ribbon 18. FIGURE 2 illustrates, in cross section, a typical ribbon formed by prior art rollers. Enlarged beaded edges 20, together with obvious warp or bow, render the ribbon unuseable. To be useful and useable as capacitor dielectric for example, a ribbon must be substantially free from defects, that is, it must be free of warp and bow, must not have enlarged, beaded edges, and must not break, check or crack.

Figure 3:
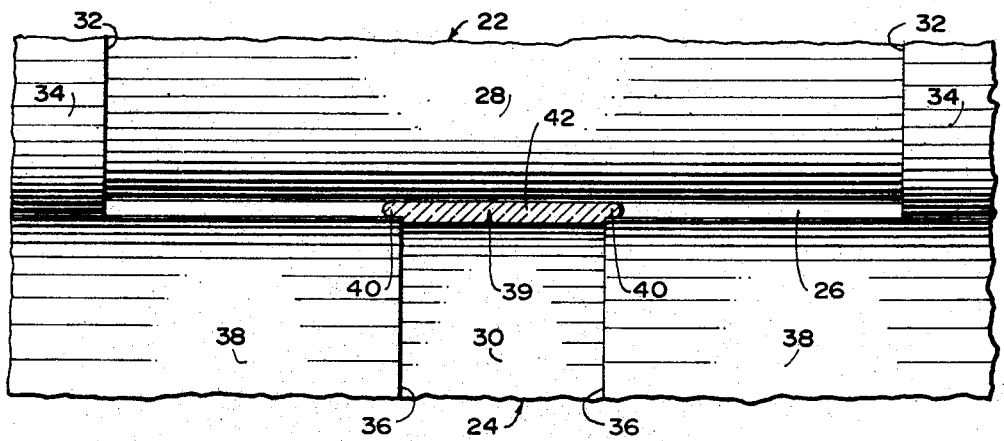
FIGURE 3 is an enlarged, fragmentary, plan view of a pair of ribbon forming rollers in accordance with the present invention.

It has been found that enlarged beaded edges and bowed ribbon may be prevented by providing a pair of cooperating rollers in acordance with the present invention, exemplified by FIGURE 3. Rollers 22 and 24 are cooperatively engaged, forming closed orifice 26 therebetween. The orifice, having an elongated T cross sectional shape, is defined by shallow channels 28 and 30, recessed into the surfaces of rollers 22 and 24, respectively. The channels, having substantially flat bottoms, are bounded by sidewalls 32 and 36 which terminate in shoulder portions 34 and 38 intermediate the ends of the rollers. The shoulder portions are shown in substantially, continuous, mutual rolling contact, and ribbon 39 is shown being formed in the orifice. The rollers may be fabricated from metals such as stainless steel, tool steel and the like. The amount of heat transferred from the molten ribbon material to the rollers during forming is important and must be sufficient to prevent the ribbon from sticking to the forming surfaces, but not so great that the ribbon is chilled excessively and prematurely, causing it to set up, and be crushed, checked or cracked. A suitable means for providing the desired heat transfer characteristics is to coat the metal of the rollers with a refractory material such as alumina. Rollers made entirely from refractory materials have been unsuccessful because insufficient heat was transferred from the molten material during forming. Rollers made from uncoated metal transfer too much heat from the molten material during ribbon forming. It is desirable that the alumina cladding be deposited in a uniformly dense but thin layer, such as may be produced by flame spraying. The coating must be free from pits, voids and discontinuities, and it must not peel, crack or flake from the rollers. Suitable cladding thickness has been found to be between about .001 to .010 inch.

Another means for providing satisfactory heat transfer is to cool the rollers by making them hollow and passing coolant therethrough, as is well known in the art. Both cladding and water-cooling may, of course, be used together to provide optimum heat transfer characteristics.

Prior art rollers have had smooth, continuous surfaces without channels, and had to be separated by an amount equal to the thickness of the desired, finished ribbon. It was discovered that such prior art rollers developed vibrations and chatter creating stresses in the cooling ribbon. These stresses resulted in ribbon cracks, checks and breakage. The present invention has provided a simple and satisfactory means for damping and eliminating the vibrations, by placing and firmly holding a substantial portion of both roller surfaces in continuous, rolling contact. Such rollers must have an orifice defined between the cooperating surfaces thereof to receive the molten material for rolling into ribbon. It has been found that a satisfactory orifice is provided by wide, shallow recessed portions such as shown by channels 28 and 30 of FIGURE 3.

It will be noticed in FIGURE 3 that channel 28 is substantially wider than channel 30, providing an elongated orifice 26 which is substantialy longer than the desired ribbon width. Such an orifice is never allowed to become completely filled with molten material, and therefore continually provides a lateral expansion chamber for the material which is being squeezed laterally outward during ribbon forming. A particular advantage of such an expansion chamber is that it can accommodate slight increases in the volume of molten material delivered to the rollers without causing such problems as ribbon edge "fins," or necessitating critical and interacting adjustments of roller speed, temperature and glass viscosity.

Enlarged beaded edges are eliminated by the rollers of the present invention, which form edges 40 of ribbon 39 thinner than center portion 42 of the ribbon. The orifice and roller configuration shown in FIGURE 3 imparts a T-shaped cross section to ribbon 39, effectively thinning its edges. The thinner ribbon edges, in addition to eliminating the problem of enlarged beads, also cool more quickly than thicker edges, providing more uniform cooling between ribbon center and edge portions, helping to eliminate warp and bow. The width of the thinned edges is not critical, and may vary from a few thousandths to a few hundredths of an inch, and the thickness thereof need only be slightly less than the center portion of the ribbon.

As will be seen in subsequent figures, other orifice configurations, also capable of providing ribbon having thin edges, are possible.

As previously described, the rollers may be hollow to permit flow of coolant through them. Although uncooled rollers may be used, water cooling has been found particularly advantageous to prevent sticking of partially cooled ribbon to the roller surfaces.

It is important to prevent checks and cracks from forming in the cooling ribbon. One source of checks and cracks has been found to be the generation of shearing forces between opposing faces of the ribbon as it passes between the rollers. Unequal linear velocity of roller surfaces, such as may be caused by rollers of different diameters, or rollers driven at different surface speeds, has been found to be a major contributing factor to such shearing forces. Accordingly, the speed of each roller should be adjusted with respect to the other roller, so that both ribbon surfaces have substantially the same velocity. Such roller speed or velocity control may be conveniently accomplished by gear driving each roller, or making both roller diameters the same.

Occasionally a stone or piece of refractory material will be carried by the stream of molten, readily devitrifiable material from the melting unit to the rollers. In order to prevent damage to the roller surfaces from such a foreign particle, it is desirable that the roller metal have a hardness between Rockwell C35 and C50.

Figure 4:
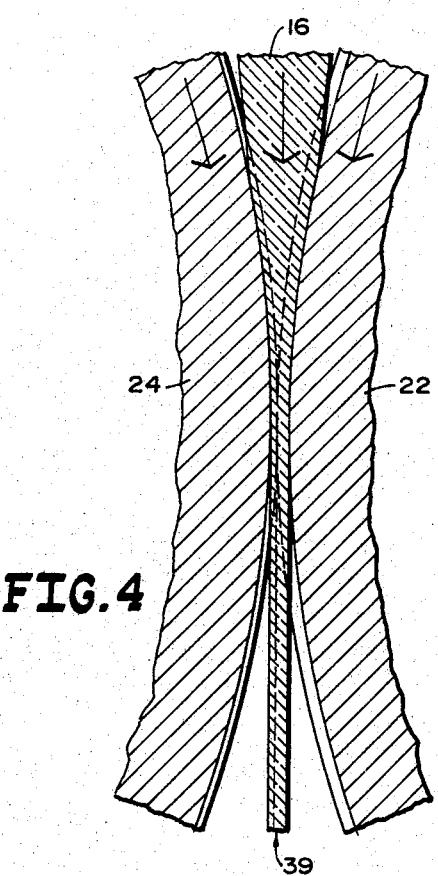
FIGURE 4 is an enlarged, fragmentary, cross sectional view of the rollers of FIGURE 3.

In FIGURE 4 another view of the embodiment of FIGURE 3 is shown. Continuous rolling contact between shoulder portions of rollers 22 and 24 is illustrated by the dashed lines. Stream 16 is being continuously formed into ribbon 39.

Figure 5:
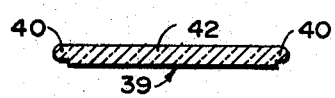
FIGURE 5 is an exaggerated, cross sectional view of a ribbon formed by the rollers of FIGURES 3 and 4.

FIGURE 5 illustrates, a regular T-shaped ribbon 39 having thin edges 40 and thicker center portion 42, as formed by the embodiment of the present invention shown in FIGURES 3 and 4. It will be noted that after passing through the forming rollers, the ribbon is substantially flat, without warp or bow, and free from enlarged beaded edges.

Figure 6:
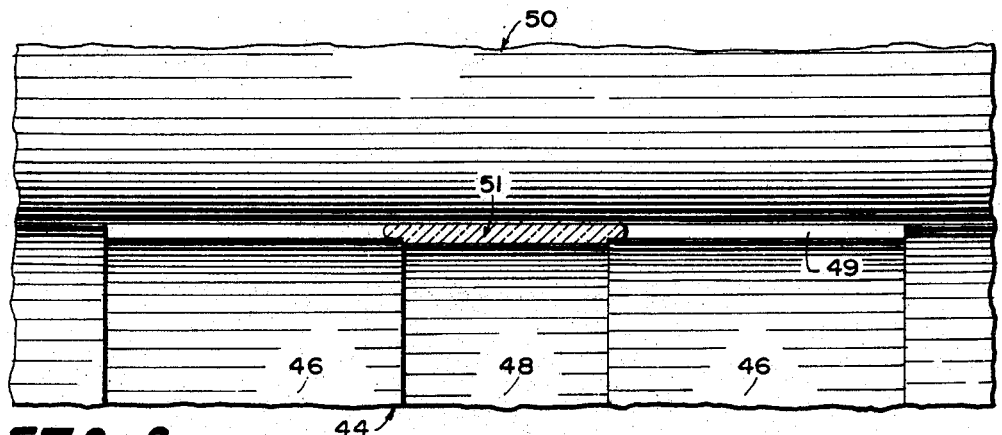
FIGURE 6 is an enlarged, fragmentary, plan view of a pair of ribbon forming rollers in accordance with another embodiment of the present invention.

In FIGURE 6 roller 44 has channels 46 and 48, and roller 50 has a smooth, unbroken surface similar to prior art rollers. This particular embodiment of the present invention forms ribbon 51 having a regular T-shaped cross section and thin edges, similar to that produced by the embodiment of FIGURES 3 and 4.

Figure 7:
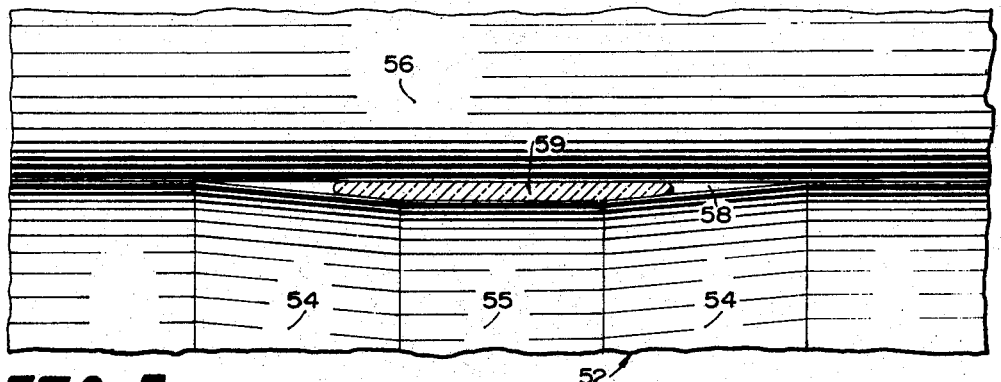
FIGURE 7 is an enlarged, fragmentary, plan view of a pair of ribbon forming rollers in accordance with still another embodiment of the present invention.

In FIGURE 7 roller 52 has tapered channel sides 54 and flat channel bottom 55, which cooperate with cylindrical roller 56 to define orifice 58. Ribbon 59 has thinned edges.

Figure 8:
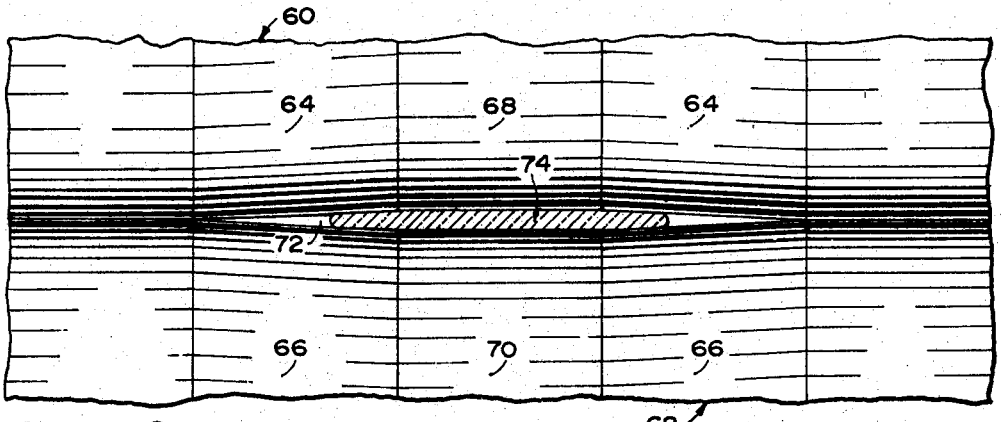
FIGURE 8 is an enlarged, fragmentary, plan view of a pair of ribbon-forming rollers in accordance with yet another embodiment of the present invention.

FIGURE 8 illustrates rollers 60 and 62 according to another embodiment of the present invention wherein channels 64 and 66, having flat bottoms 68 and 70, together define a roughly lens-shaped orifice 72. Ribbon 74 has thinned edges.

TYPICAL APPARATUS AND METHOD

In a typical, but by no means limiting, example of the present invention a pair of hollow, gear driven, ribbon forming rollers having an outside diameter of about 2.5 inches, an inside diameter of about 2 inches and a width of about 1.5 inches, are rotatably disposed, with their longitudinal axes parallel, in a suitable frame or support. The outside diameters of both rollers are the same to within about .001 inch. In one roller, a recessed circumferential channel has been formed, having a width of about one inch and a depth of about .0012 inch. The cooperating roller has a recessed circumferential channel about .230 inch wide and about .0003 inch deep. Together, these rollers form a closed T-shaped orifice about one inch long and about .0015 inch wide. The rollers are treated to a Rockwell hardness of C45 and are internally water-cooled. The rollers are clad with an alumina coating having a uniform thickness of about .005 inch. A stream of molten glass ceramic is directed into the orifice between the rollers. A typical glass ceramic composition consists essentially of $Nb_2O_5$—47.7%, PbO—18%, BaO—13%, SrO—9%, $SiO_2$—8%, $Al_2O_3$—2%, $B_2O_3$—2%, and $Cu_2O$—0.3%, by weight. In the molten state, above about 1200° C., such a material has a viscosity of about .5 poise, which is extremely low by conventional forming standards. The rollers are pressed together with a force of about 90 pounds, to maintain their shoulders in substantially continuous mutual rolling contact. As rotation of the rollers begins, a wide, thick ribbon is first formed. Roller speed is gradually increased until a semi-plastic ribbon exits the roller orifice. Roller speed is then decreased until a partly cooled, vitreous glass ceramic ribbon, free from defects, continuously exits the roller orifice. Further ribbon cooling takes place by natural heat loss. Optimum roller speed to form the above-described molten glass ceramic will be about 360 r.p.m. The cooled ribbon will be about .250 inch wide, .0015 inch thick, and substantially continuous. The orifice is never allowed to become completely filled with the molten glass ceramic. This is prevented by adjusting roller speed and visually adjusting the feed rate of the molten material. The feed rate may be controlled by any of several well-known means, the particular method used herein being application of pneumatic pressure to an enclosed quantity of molten glass ceramic thereby forcing it to flow at a desired rate through a given orifice.

Although the present invention has been described with respect to specific details of certain embodiments thereof, it is not intended that such details be limitations upon the scope of the invention except insofar as set forth in the following claims.

I claim:
1. An improved apparatus for forming a length of thin ribbon from a vitreous material comprising:
a pair of driven, clad cylindrical rollers disposed parallel and in substantially continuous rolling contact with each other, defining therebetween an elongated orifice having closed end portions, the center portion of said orifice being deeper than said end portions; said orifice being formed by a circumferential channel incorporated intermediate the ends of at least one roller, said channel having a bottom portion and sides, said sides terminating in cylindrical shoulder portions, the cylindrical shoulder portion at each end of said channel in one of said rollers contacting the corresponding cylindrical surface of the other of said rollers to provide said substantially continuous rolling contact between said rollers.

2. The apparatus of claim 1 wherein said rollers are made of metal and have external surfaces clad with a refractory material.

3. The apparatus of claim 2 wherein said refractory material is alumina.

4. The apparatus of claim 3 wherein said orifice has a T-shaped cross section.

5. The apparatus of claim 4 wherein said orifice has tapered end portions.

6. The apparatus of claim 1 wherein both rollers incorporate circumferential channels intermediate the ends thereof.

7. The apparatus of claim 6 wherein said channel in one roller is wider than the channel in the other roller, and aligned therewith, defining an elongated, regular, T-shaped orifice therebetween.

References Cited

UNITED STATES PATENTS

| | | | |
|---|---|---|---|
| 3,346,359 | 10/1967 | Forster et al. | 65—255 XR |
| 3,353,943 | 11/1967 | Loutte | 65—374 XR |
| 3,284,182 | 11/1966 | Jamnik | 65—94 XR |
| 3,227,537 | 1/1966 | Novack | 65—101 |
| 2,643,486 | 6/1953 | English | 65—255 |
| 2,300,528 | 11/1942 | Sherts | 65—374 XR |
| 1,895,916 | 1/1933 | Cone | 65—253 XR |
| 1,772,072 | 8/1930 | Drake | 65—254 XR |
| 1,608,644 | 11/1926 | Black | 65—253 XR |

FOREIGN PATENTS 1,202,834  7/1959  France.

FRANK W. MIGA, Primary Examiner

U.S. Cl X.R.

65—101, 169, 170, 356